United States Patent [19]

Herrin

[11] Patent Number: 4,935,315
[45] Date of Patent: Jun. 19, 1990

[54] CELL BYPASS CIRCUIT

[75] Inventor: Jerry Herrin, Santa Ana, Calif.

[73] Assignee: Hughes Aircraft Company, Los Angeles, Calif.

[21] Appl. No.: 279,759

[22] Filed: Dec. 5, 1988

[51] Int. Cl.⁵ ............... H01M 10/44; H01M 2/00
[52] U.S. Cl. ............................. 429/50; 429/61; 429/90; 337/15
[58] Field of Search ............... 429/50, 61, 90, 92, 429/93; 337/15, 20

[56] References Cited

U.S. PATENT DOCUMENTS

| | | | |
|---|---|---|---|
| 2,499,663 | 3/1950 | Medlar | 429/61 X |
| 3,554,804 | 1/1971 | Carson | 429/61 X |
| 4,252,869 | 2/1981 | Heitz et al. | 429/121 X |

FOREIGN PATENT DOCUMENTS 57-210577 12/1982 Japan ..................... 429/61

Primary Examiner—Stephen J. Kalafut
Attorney, Agent, or Firm—Steven M. Mitchell; Wanda Denson-Low

[57] ABSTRACT

A cell bypass circuit is disclosed which includes a diode 32 connected electrically in parallel with a cell 20 of a battery 12. A thermal switch 34 is mounted in thermal contact with a diode 32. A relay 38 including a coil 36 and a contact 40 is provided. The coil 36 is connected to the thermal switch 34 so as to be activated by the activation thereof. The contact 40 of the relay 38 is connected in parallel with the cell 20 so that the activation of the diode 32 causes thermal energy to radiate therefrom activating the thermal switch 34. The activation of the thermal switch 34 causes the activation of the relay 38 which in turn places an electrical short across the defective cell 20 via the contacts 40 thereof.

6 Claims, 1 Drawing Sheet

CELL BYPASS CIRCUIT

BACKGROUND OF THE INVENTION

1. Field of the Invention

The present invention relates to electrical battery systems. More specifically, the present invention relates to systems for protecting against failure of electrical batteries.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Batteries are used to provide an alternative source of power for a variety of power supply schemes. As is known in the art, the failure of a cell in a battery generally creates an "open circuit" in the system in which the battery is connected. Unfortunately, in many applications, such open circuit failure would have significant adverse consequences. In satellite applications, for example, the failure of a cell of a battery would interrupt the power supplied to the processor of the spacecraft. The contents of any volatile memory may be lost and, accordingly, if and when power is restored, the system would in effect be out of place with regard to the tasks being processed. Worse yet, the system may come up in a condition which would jeopardize the spacecraft mission, viz., false booster firing.

The design of satellite processors to circumvent this possibility is expensive and typically imposes some performance tradeoffs. Accordingly, the more common approach has been to provide some means for detecting and bypassing cell failure. Two techniques are well known in the art. One involves a network of diodes in which a diode is coupled in parallel to each cell. In this configuration, so long as the cell is operative, the diode is back biased, electrically open and substantially invisible to the surrounding circuit. When the cell fails, the diode is forward biased by the current supplied by the healthy cells and provides a bypass around the defective cell. While this approach is effective and inexpensive, the inherent resistance of the diode drains energy from the other cells and dissipates it in the form of heat. The power drain forces a requirement for additional solar panels or battery cells on the system to protect against this failure mode. The dissipation of energy in the form of heat may adversely affect the operation the battery or other sensitive elements of the system. The often used technique of heat sinking of the diode adds to the fabrication cost and weight of the satellite while doing nothing to address the power drain problem.

An alternative conventional technique involves the monitoring of the power level of each cell to detect an impending failure. Voltage levels are telemetered to a controller or operator at a ground station. The operator responds to impending failure data by sending a command to the satellite to bypass the failing cell in advance of the open circuit failure. Since the bypass is effected by a short circuit with virtually no resistance, there is no power dissipated with this technique. Unfortunately, effective operation of this system requires the presence of the human operator to provide the necessary commands in a sufficiently timely manner. The obvious disadvantages of predicating successful satellite operation on the fortuitous presence of a human operator render this alternative somewhat less than totally satisfactory.

There is therefore a need in the art for an inexpensive cell bypass system which automatically protects against cell failure without draining power from the system or otherwise adversely affecting system operation.

SUMMARY OF THE INVENTION

The need in the art is addressed by the cell bypass circuit of the present invention. The present invention includes a diode connected electrically in parallel with a cell of a battery. A thermal switch is mounted in thermal contact with the diode. A relay including a coil and a contact is provided. The coil is connected to the thermal switch so as to be activated by the activation thereof. The contact of the relay is connected in parallel with the cell so that the activation of the diode causes thermal energy to radiate therefrom activating the thermal switch. The activation of the thermal switch causes the activation of the relay which in turn places an electrical short across the defective cell via the contacts thereof.

DESCRIPTION OF THE INVENTION

Figure 1:
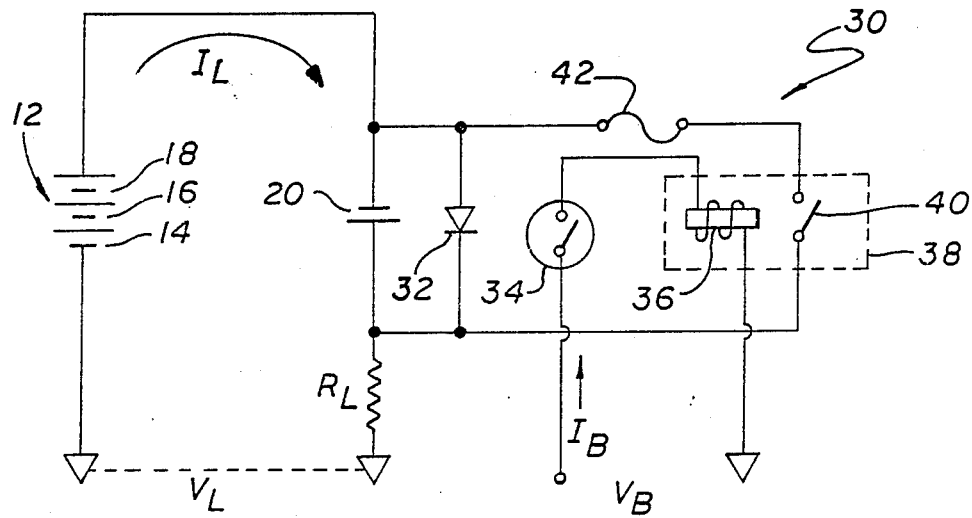
FIG. 1 is a schematic diagram of a preferred embodiment of the cell bypass circuit of the present invention.
Figure 2:
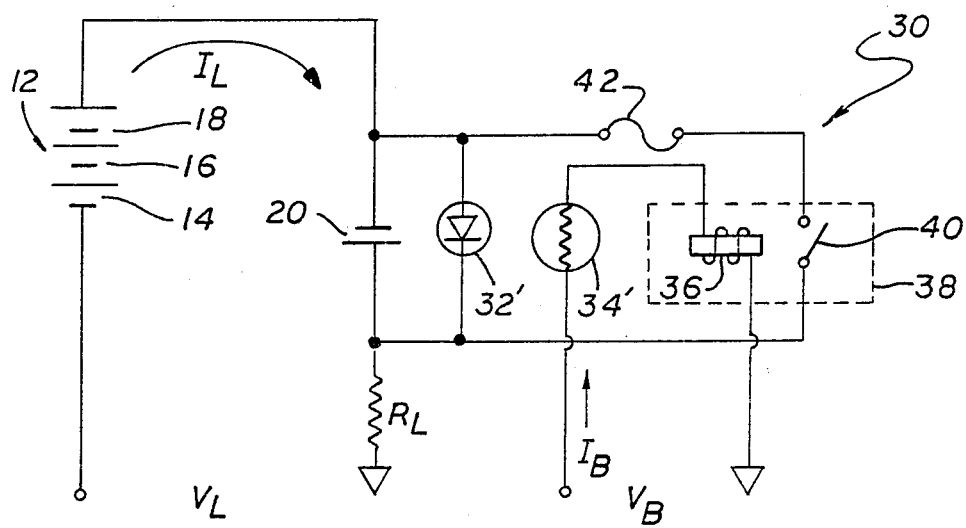
FIG. 2 is a schematic diagram of an alternative embodiment of the cell bypass circuit of the present invention.

The cell bypass circuit of the present invention is disclosed herein with reference to a preferred embodiment of FIG. 1 and an alternative embodiment of FIG. 2. FIG. 1 shows the cell bypass circuit of the present invention in a typical battery circuit. The battery circuit 10 includes a battery 12 having cells 14, 16, 18, and 20. For the purpose of illustration, one cell, the fourth cell 20, is chosen as the defective cell and is therefore shown separate from the other cells 14, 16, and 18. The battery operates across some load represented by the resistor $R_L$. The negative terminal of the first cell 14 is connected to spacecraft structure which is also common to the other end of the load. An illustrative implementation of the cell bypass circuit 30 of the present invention is shown across the fourth cell 20 of the battery 12.

The cell bypass circuit 30 includes a diode 32 connected in parallel with the cell 20. Note that the anode of the diode is connected to the anode of the cell 20. Thus, no current flows from cell 20 thru diode 32. A thermal switch 34 is mounted in close physical proximity to the diode 32 to facilitate thermal conductivity therebetween. In the preferred embodiment, the thermal switch 34 is thermally bonded to the diode 32. The thermal switch 34 is connected electrically to the coil 36 of a relay 38. A normally open contact 40 of the relay 38 is connected electrically across the diode 32 via a fuse 42. The fuse 42 is provided in the event the bypass circuit 30 is false triggered across a healthy battery cell. That is, in a typical spacecraft application, the output current of a single healthy cell may be substantially higher than nominal spacecraft current. Thus, in the preferred embodiment, the fuse is chosen to have a rating 4 to 5 times higher than the nominal spacecraft current rating and 2 to 3 times lower than the short circuit rating of a single cell.

A bus voltage $V_B$ is applied across the thermal switch 34 and the relay coil 36. In the preferred embodiment, the cell bypass circuit 30 is built in a potted cube and bolted onto the battery 12 with pigtail leads.

In operation, so long as the fourth cell 20 is healthy, the load current $I_L$ from the battery flows into the load $R_L$ and the diode 32 is back biased and off. When the fourth cell 20 fails, it goes open and impedes the current flow therethrough. When the drop across the defective cell 20 exceeds the turn-on voltage of the diode 32, the diode 32 turns on and begins to conduct. The load current $I_L$ now flows through the diode 32 and due to the internal resistance of the diode 32, it begins to radiate thermal energy. The thermal radiation from the diode 32 is received by the thermal switch 34. When the thermal radiation of the diode exceeds the threshold of the thermal switch 34, the thermal switch 34 switches on and a current $I_B$ flows through the coil 36 of the relay 38. This activates the relay 38 so that the normally open contact 40 of the relay 38 closes. As the contact 40 is electrically in parallel with the diode and the cell 20, the activation of the relay 36 places an electrical short across the cell 20. Thus, the load current $I_L$ is bypassed around the defective cell 20. With the defective cell 20 bypassed through the relay, the diode 32 cools and the thermal switch 34 opens and removes excitation from the coil 36 of the relay 38. Relay 38, is of the magnetic latching type and remains semi-permanently in one of either of two possible states i.e. open or closed depending upon which was the commanded operation. The open command coil has not been illustrated in bypass circuit 30 because it is used during manufacture and ground testing to initialize the relay 38 to the open state. Other latching relay designs are possible, including mechanical and electrically operated latches.

While the present invention has been described herein with reference to an illustrative embodiment for a particular application, it is understood that the invention is not limited thereto. Those having ordinary skill in the art will recognize additional modifications, applications and embodiments within the scope thereof. For example, a number of sensing and switching schemes may be employed without departing from the scope of the invention. This is exemplified in FIG. 2 which shows an alternative embodiment in which the diode 32 of FIG. 1 has been replaced by a light emitting diode 32' and the thermal switch 34 of FIG. 1 has been replaced by an optical sensing element 34'. The operation of this embodiment is essentially the same as that of FIG. 1, with the exception that light emitted by the current sensing photodiode 32' performs the function of the heat radiation of the diode 32 and optical sensing is used instead of heat sensing to activate the relay 38. It is understood that Hall Effect devices may be used for sensing in place of the diode 32 and that a silicon controlled rectifier (SCR) or a field effect transistor (FET) may be used for switching in lieu of the thermal switch 34.

It is intended by the appended claims to cover any and all such modifications, applications and embodiments.

Accordingly,
What is claimed is:

1. A cell bypass circuit including:
   a diode connected electrically in parallel with said cell;
   a thermal switch mounted in thermal contact with said diode;
   a relay including a coil and a contact, said coil being connected to said thermal switch so as to be activated by the activation thereof, and said contact being connected in parallel with said cell;
   whereby the activation of said diode causes thermal energy to radiate therefrom activating said thermal switch thereby and the activation of said thermal switch causes the activation of said relay which in turn places an electrical short via said contacts across said cell.

2. The cell bypass circuit of claim 1 including a fuse between one terminal of said contact and one terminal of said cell.

3. A cell bypass circuit including:
   a photodiode connected electrically in parallel with said cell;
   a photosensitive means for detecting light emitted by said photodiode;
   a relay including a coil and a contact, said coil being connected to said photosensitive means so as to be activated by the activation thereof, and said contact being connected in parallel with said cell;
   whereby the activation of said diode causes optical energy to radiate therefrom activating said photosensitive means thereby and the activation of said photosensitive means causes the activation of said relay which in turn places an electrical short via said contacts across said cell.

4. The cell bypass circuit of claim 3 including a fuse between one terminal of said contact and one terminal of said cell.

5. A method of bypassing a defective cell of a battery including the steps of:
   (a) monitoring the current flow through said cell;
   (b) activating diode means when the current flow through the cell drops below a predetermined threshold;
   (c) radiating energy from said diode means on the activation thereof;
   (d) sensing the radiation from said diode means;
   (e) activating a relay based on the radiation sensed from said diode means; and
   (f) shorting said defective cell based on the activation of said relay.

6. A method of automatically bypassing a defective cell of a battery including the steps of:
   (a) monitoring the current flow through said cell;
   (b) activating diode means when the current flow through the cell drops below a predetermined threshold;
   (c) sensing the radiation from said diode means on the activation thereof; and
   (d) electrically bypassing said defective cell based on the receipt of radiation from said diode means.

* * * * *